United States Patent [19]

Walz

[11] Patent Number: 5,004,200

[45] Date of Patent: Apr. 2, 1991

[54] SHELF BOARD FITTING

[75] Inventor: Rüdiger Walz, Nagold-Hochdorf, Fed. Rep. of Germany

[73] Assignee: Häfele KG, Nagold, Fed. Rep. of Germany

[21] Appl. No.: 422,764

[22] Filed: Oct. 17, 1989

[30] Foreign Application Priority Data

Oct. 19, 1988 [DE] Fed. Rep. of Germany ....... 8813183

[51] Int. Cl.⁵ .............................................. A47B 57/04
[52] U.S. Cl. ................................ 248/250; 248/222.1; 211/90; 108/108
[58] Field of Search ............... 248/235, 250, 222.1; 108/108, 152; 292/217, 218; 211/90

[56] References Cited

U.S. PATENT DOCUMENTS

| | | | |
|---|---|---|---|
| 3,363,867 | 1/1968 | Zackrisson | 248/250 |
| 4,101,231 | 7/1978 | Streib | 248/222.1 X |
| 4,175,781 | 11/1979 | Dumortier | 292/218 |
| 4,618,117 | 10/1986 | Gerbe | 248/222.1 |
| 4,709,892 | 12/1987 | Gurgui | 248/250 |
| 4,766,930 | 8/1988 | Fox | 248/250 X |
| 4,799,330 | 1/1989 | Hudson | 292/218 X |

FOREIGN PATENT DOCUMENTS 460291  5/1928  Fed. Rep. of Germany ... 248/222.1

Primary Examiner—Alvin C. Chin-Shue
Attorney, Agent, or Firm—Toren, McGeady & Associates

[57] ABSTRACT

A fitting for boards, particularly for shelf boards. The fitting includes a support member arranged in the board and a fastening member which engages a groove of the support member and is adapted to be mounted on the wall component. The fastening member has a groove-like recess which extends transversely of the direction of insertion of the fastening member. A locking disk is rotatably mounted in the support member for engaging the recess of the fastening member. The locking disk releases the fastening member when the locking disk is in the unlocked position. In the locked position, the fitting cannot be disengaged when an impact occurs from below.

10 Claims, 3 Drawing Sheets

SHELF BOARD FITTING

BACKGROUND OF THE INVENTION

1. Field of the Invention

The present invention relates to a fitting for boards, particularly for shelf boards. The fitting includes a support member arranged in the board and a fastening member which engages in a groove of the support member and is adapted to be mounted on a wall component.

2. Description of the Related Art

For fastening shelf boards to wall components it is already known to press a support member into the board, wherein the support member is slid with a groove, a slot or the like onto a usually hook-shaped fastening element. However, this has the disadvantageous that, if an impact occurs on the board from below, the board is lifted together with the support member above the fastening member and, thus, the support member is unintentionally disengaged.

It is, therefore, the primary object of the present invention to provide a fitting of the above-described type which is of simple construction and which is secured in both directions, so that an unintentional disengagement is avoided.

SUMMARY OF THE INVENTION

In accordance with the present invention, the fastening member has a groove-like recess which extends transversely of the direction of insertion of the fastening member and a locking disk is rotatably mounted in the support member for engaging the recess of the fastening member, wherein the locking disk releases the fastening member when the locking disk is in its unlocked position of rotation.

Accordingly, after the support member fastened in the shelf board has been slid onto the fastening member, it is now merely necessary to rotate the disk until it engages in the recess in order to achieve a secure fastening of the shelf board in both directions. The fitting is of especially simple construction and, in addition to the support member and the fastening member, merely has the rotatable locking disk. It is an advantage if the locking disk has an approximately semicircular shape so that sufficient free space for releasing the connection is provided in the unlocked position.

To make it possible to pull the components to be fastened tightly together, another feature of the invention provides that the contact surface of the recess for the locking disk in turning direction thereof and the contact surface of the locking disk are inclined in opposite directions. Thus, when the disk is turned, the fastening member is tightly pressed against its stop and, consequently, against the support member.

In accordance with an advantageous feature, the fastening member is angle-shaped. One side of the fastening member serves for fastening the fastening member to the wall component and engages in a groove of the support member and the other side of the fastening member covers the support member. To make it easier to turn the disk, the disk has a projection on which a tool can act. The side of the fastening member covering this projection is provided with an opening at the projection.

In accordance with another feature of the present invention, the locking disk is connected to a locking member which interacts with a projection of the fastening member. This results in the locked position in a fastening of the components relative to each other which is particularly free of play.

In accordance with a preferred feature, the locking member has the shape of a segment of a circle. The locking disk is connected to the locking member through a shaft which is mounted rotatably in a shoulder within the support member, wherein the two parts are arranged on opposite sides of the shoulder.

A bushing constructed as a threaded member advantageously is arranged on the side of the locking device which faces the locking member. The bushing rests against the shoulder. In addition, the shaft is provided with a play which corresponds to the pitch of the thread of the bushing. This results in two significant advantages. In the unlocked position, the projection for the tool is aligned with the upper edge of the support member, so that boards provided with such support members can be stacked without difficulties and without requiring intermediate layers. In the locked position, the projection is raised and is in alignment with the upper surface of the fastening member, so that the appearance of the fitting is substantially improved.

The turning movements of the disk can be limited by means of stops, so that the locked position and the unlocked position are exactly defined. For mounting the shaft with the locking disk and the shoulder of the locking member, the support member advantageously has a passage opening for the locking member, wherein the width of the opening is reduced by a detent. This simplifies the assembly of the components by merely inserting the shaft with the locking member into the opening and passing the detent by overcoming pressure, so that the components are undetachably connected to each other.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DESCRIPTION OF THE PREFERRED EMBODIMENT

Figure 1:
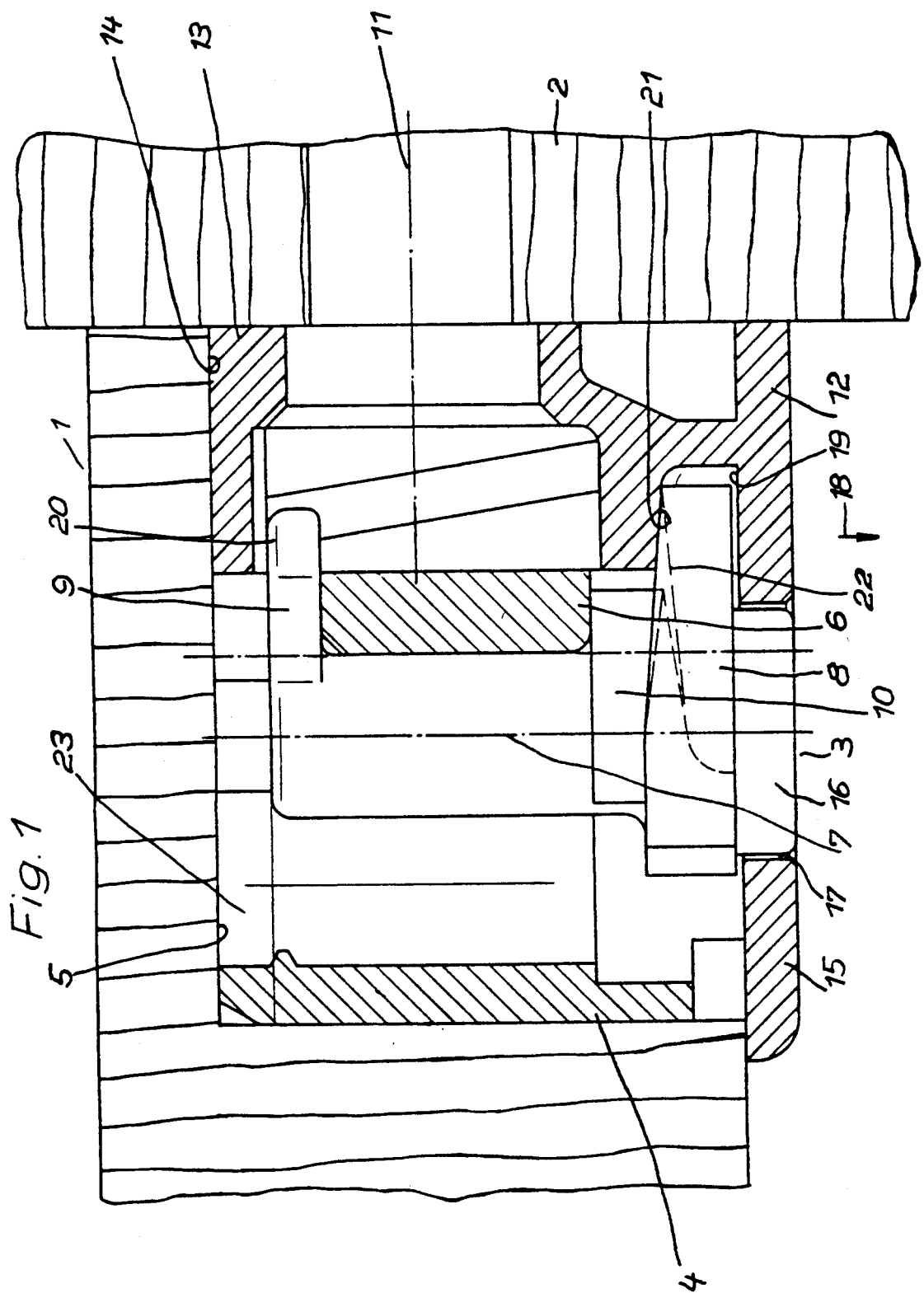
FIG. 1 is a cross-sectional view of a shelf board which is fastened to a side wall by means of a fitting according to the present invention, wherein the fitting is in the locked position.

As illustrated in the drawing, a fitting 3 connects a shelf board 1 with a side wall 2. The fitting 3 is composed of an approximately cylindrically-shaped support member 4 which is inserted into a recess 5 of the board 1. A shoulder 6 is provided within the support member 4. The shoulder 6 serves for rotatably supporting a shaft 7. A locking disk 8 whose periphery slightly exceeds a semicircle is arranged at one end of the shaft 7 and a segment-shaped locking member 9 is arranged at the other end of the shaft 7. A bushing 10 in the form of a thread is provided on the side of the locking disk 8 which is located opposite the locking member 9. The bushing 10 rests on the shoulder 6 of the support member 4. The shaft 7 is mounted with play within the shaft 6, wherein the play corresponds to the pitch of the thread of the bushing 10. A projection 16 for a tool, not shown, is provided for facilitating the turning of the shaft 7 with the locking disk 8 and the locking member 9.

An angle-shaped fastening member 12 is connected to the side wall 2 by means of a screw connection at 11. The side 13 of the fastening member 12 used for the screw connection is inserted into a groove 14 of the support member 4. The other side 15 of the fastening member 12 covers the support member 4 and has an opening 17 for the projection 16 of the locking disk 8. A groove-like recess 19 is provided in the fastening member 12 for engagement by the locking disk 8. The groove-like recess 19 extends transversely of the direction of insertion 18 of the support member 4 relative to the fastening member 12. The fastening member 12 has a projection 20 for securing the locking member 9. The contact surface 21 of the groove-like recess 19 of the fastening member 12 is inclined upwardly in the direction of rotation of the locking disk 8 and the contact surface 22 of the locking disk 8 is inclined in the opposite direction.

Figure 2:
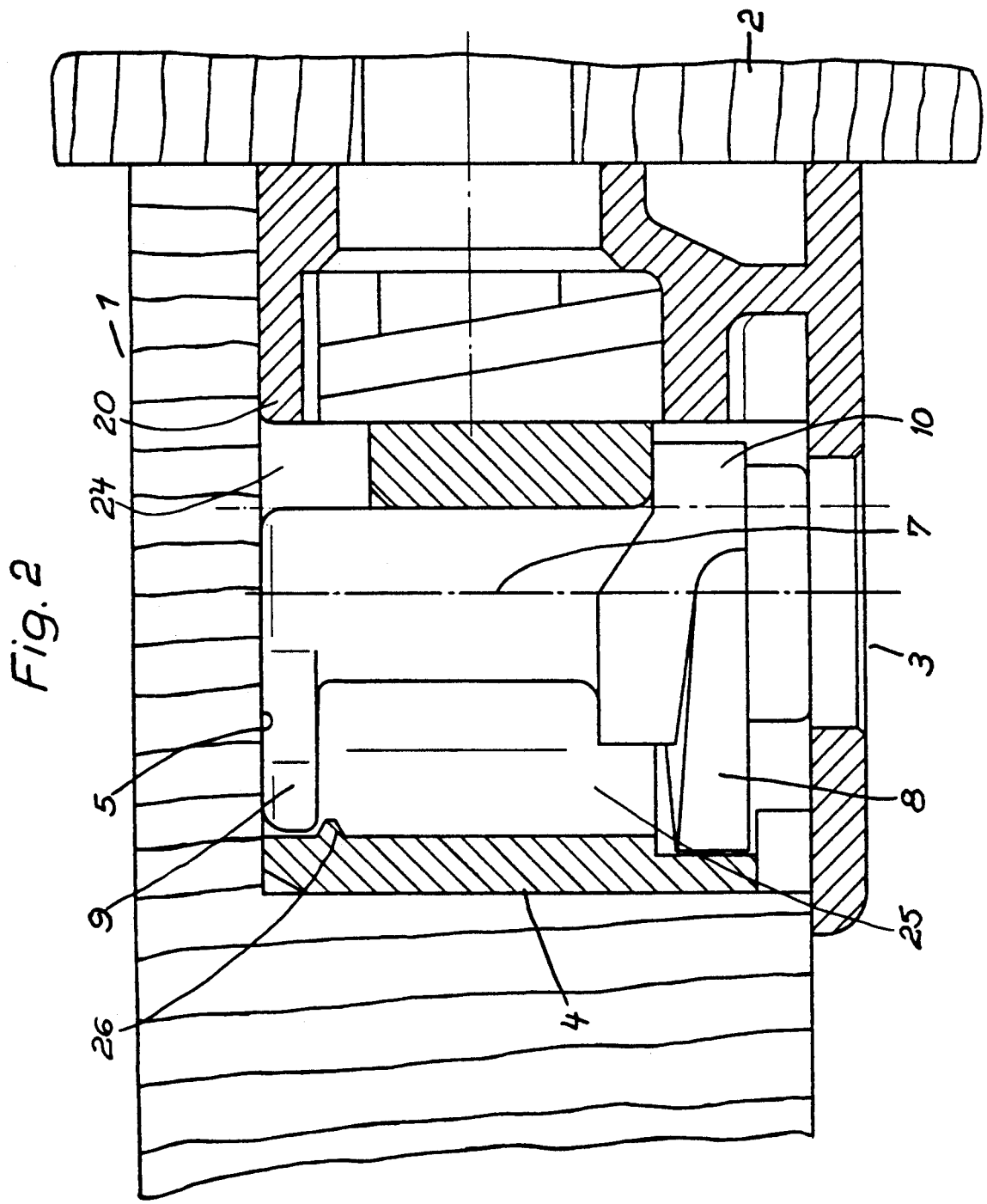
FIG. 2 is the same view as FIG. 1 with the fitting being in the position.
Figure 3:
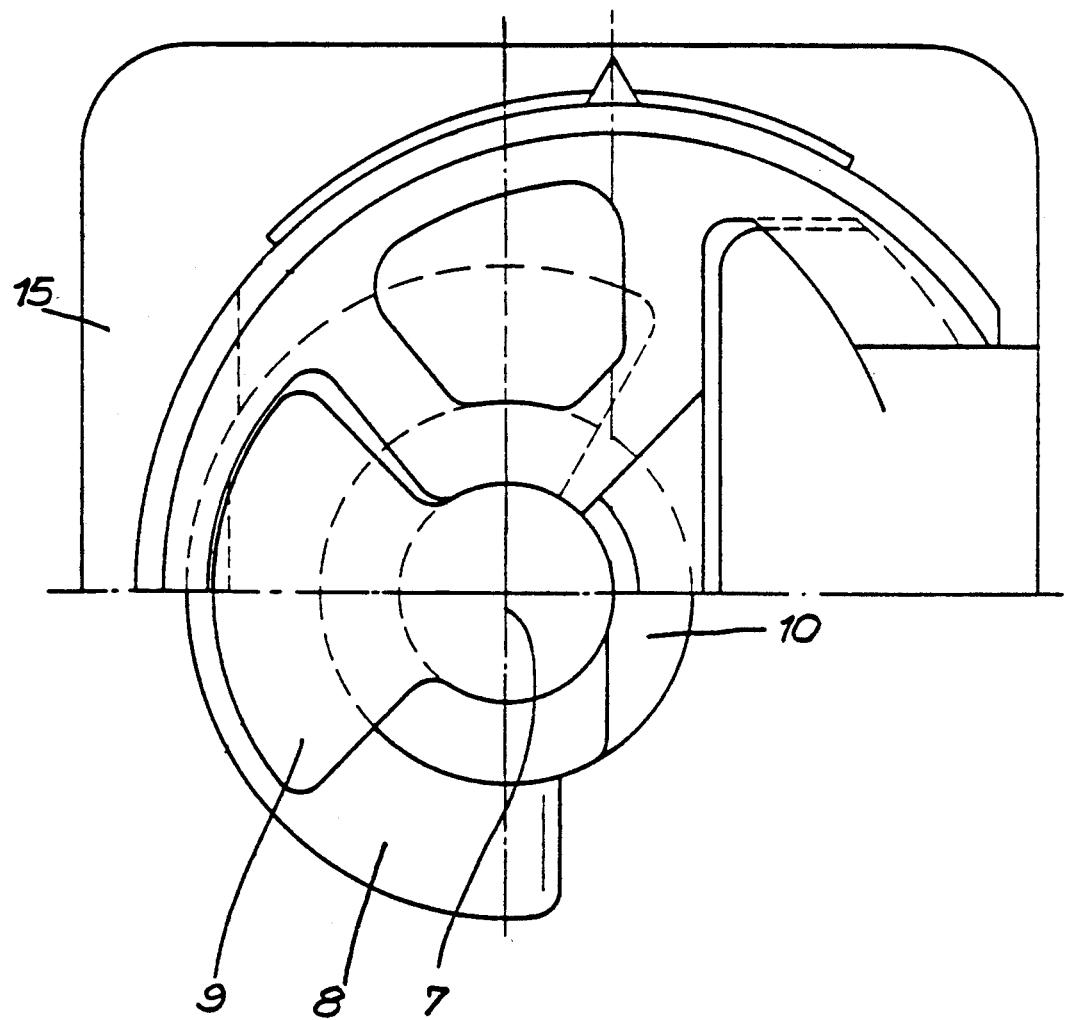
FIG. 3 is a top view of the fitting of FIG. 1, wherein only half of fastening element is shown.

When the projection 16 is turned counterclockwise as seen in FIG. 3 of the drawing, the locking disk 8 and the locking member 9 are pivoted from the unlocked position illustrated in FIG. 2 into the locked position shown in FIG. 1. In the unlocked position shown in FIG. 2, the projection 16 is arranged flush with the upper edge of the support member 4 or with the surface of the board 1, so that it is possible to stack several boards without intermediate layers. When the projection 16 is turned, the bushing 10 resting against shoulder 6 forces due to its threaded construction the shaft 7 in the direction of arrow 18, so that, in the locked position shown in FIG. 1, the projection 16 is flush with the surface of the side 15 of the fastening member 12, so that the fitting has a smooth appearance. In this position, the locking disk 8 has now entered the groove-like recess 19 and, due to the inclined surfaces of both parts, the fastening member 12 is pressed against the support member 4 and, thus, the board 1 is secured relative to side wall 2. A rotation of the shaft 7 also pivots the locking member 9 into a locking position above projection 20. As a result, the fastening member 12 is secured relative to the support member 4 in the direction of arrow 18 as well as in the opposite direction.

Stops 23 and 24 are provided for defining locked and unlocked positions of locking disk 8. The shoulder 6 has a passage opening 25 for the locking member 9, wherein the width of the opening is reduced by a detent 26.

While a specific embodiment of the invention has been shown and described in detail to illustrate the application of the inventive principles, it will be understood that the invention may be embodied otherwise without departing from such principles.

I claim:

1. In a fitting for a board, particularly for a shelf board, the fitting including a support member having a groove, the support member being attached to the board, and a fastening member which engages in the groove of the support member and is adapted to be inserted in a wall component in a direction of insertion, the improvement comprising the fastening member having a groove-like recess which extends transversely of the direction of insertion of the fastening member, a locking disk being rotatably mounted in the support member for engaging the recess of the fastening member, wherein the locking disk is rotatable between a locked position and an unlocked position of rotation, the locking disk releasing the fastening member when the locking disk is in the unlocked position of rotation.

2. The fitting according to claim 1, wherein the locking disk has an approximately semicircular shape.

3. The fitting according to claim 1, wherein the recess and the locking disk each have a contact surface, the contact surface of the recess and the contact surface of the locking disk facing each other, the contact surface of the recess being inclined upwardly in the direction of rotation of the locking disk and the contact surface of the locking disk being inclined upwardly in a direction opposite the direction of rotation of the locking disk.

4. The fitting according to claim 1, wherein the fastening member is angle-shaped having first and second sides, the first side of the fastening member being adapted for fastening the fastening member to the wall component, the first side of the fastening member being inserted in the groove of the support member, and the second side of the fastening member covering the support member.

5. The fitting according to claim 4, wherein the locking disk has a projection on which a tool can act and wherein the second side of the fastening member covering the support member is provided with an opening at the projection.

6. The fitting according to claim 1, wherein the locking disk is connected to a locking member which acts on a projection of the fastening member.

7. The fitting according to claim 6, wherein the locking member is circle segment-shaped, the support member having a shoulder, a shaft being mounted rotatably in the shoulder within the support member, the shaft connecting the locking disk with the locking member, the locking disk and the locking member being arranged on opposite sides of the shoulder.

8. The fitting according to claim 7, wherein a bushing comprising a thread is arranged on the side of the locking disk facing the locking member, the bushing resting on the shoulder of the support member, the thread having a pitch, the shaft being provided mounted within the support member with a play, the play corresponding to the pitch of the thread.

9. The fitting according to claim 1, comprising stop means for defining the locked and unlocked positions of the locking disk.

10. The fitting according to claim 7, wherein the shoulder defines a passage opening for the locking member, wherein the width of the opening is reduced by a detent.

* * * * *